US006996984B2

(12) United States Patent
Sawdon et al.

(10) Patent No.: US 6,996,984 B2
(45) Date of Patent: Feb. 14, 2006

(54) AIR-TO-OIL INTENSIFYING CYLINDER (75) Inventors: Edwin G. Sawdon, St. Clair, MI (US); Steven J. Sprotberry, Marysville, MI (US)

(73) Assignee: BTM Corporation, Marysville, MI (US)

( * ) Notice: Subject to any disclaimer, the term of this patent is extended or adjusted under 35 U.S.C. 154(b) by 68 days.

(21) Appl. No.: 10/751,852

(22) Filed: Jan. 6, 2004

(65) Prior Publication Data
US 2005/0144943 A1    Jul. 7, 2005

(51) Int. Cl.
F15B 7/00    (2006.01)
(52) U.S. Cl. .............................. 60/534; 60/563; 60/583
(58) Field of Classification Search .................. 60/534, 60/563, 547.1, 565, 583
See application file for complete search history.

(56) References Cited

U.S. PATENT DOCUMENTS

| | | | | |
|---|---|---|---|---|
| 2,827,766 A | * | 3/1958 | Hufford | ........................ 60/560 |
| 2,867,088 A | * | 1/1959 | Kux | ............................ 60/563 |
| 3,426,530 A | | 2/1969 | Georgelin | |
| 3,633,365 A | | 1/1972 | Belknap | |
| 4,135,076 A | * | 1/1979 | Beneteau | ................... 60/547.1 |
| 4,271,671 A | | 6/1981 | Smeets | |
| 4,300,351 A | | 11/1981 | Grullmeier | |
| 4,395,027 A | | 7/1983 | Nordmeyer | |
| 4,499,728 A | | 2/1985 | Therond | |
| 4,993,226 A | | 2/1991 | De Kok | |
| 5,107,681 A | | 4/1992 | Wolfbauer, III | |
| 5,218,821 A | | 6/1993 | Beneteau | |
| 5,247,871 A | | 9/1993 | Brasca et al. | |
| 5,265,423 A | | 11/1993 | Glaser | |
| 5,429,036 A | | 7/1995 | Latos | |
| 5,526,644 A | | 6/1996 | Brieschke | |
| 5,582,009 A | | 12/1996 | Brieschke | |
| 5,649,424 A | | 7/1997 | Valavaara | |
| 5,865,029 A | | 2/1999 | Brieschke | |
| 5,943,862 A | * | 8/1999 | Malina | ........................ 60/563 |
| 6,735,944 B1 | * | 5/2004 | Sawdon | ........................ 60/563 |

OTHER PUBLICATIONS

Tox Pressotechnik product brochure, 12 pages, publication date unknown, but believed to be prior to Jan. 6, 2004.
Multicyl product brochure, 8 pages, dated Jul. 1998.
Aries Engineering Company Inc. product brochure, 5 pages, publication date unknown, but believed to be prior to Jan. 6, 2004.
Farger & Joosten product brochure, 4 pages, dated Sep. 1999.
Farger & Joosten product brochure, 2 pages, dated Mar. 1999.
Alfamatic product information from website, 2 pages, publication date unknown, but believed to be prior to Jan. 6, 2004.
G.P.A. Italiana S.p.A. product information from website, 2 pages, publication date unknown, but believed to be prior to Jan. 6, 2004.
Attexor Inc. product brochure, 2 pages, publication date unknown, but believed to be prior to Jan. 6, 2004.
OHMA Piercing Cylinder Product Guide, Version 3.0, 36 pages, dated 2003.

* cited by examiner

Primary Examiner—F. Daniel Lopez
(74) Attorney, Agent, or Firm—Harness, Dickey & Pierce, P.L.C.

(57) ABSTRACT

A pressure intensifier for generating a relatively large force includes a plurality of pistons driven in advancing and retracting directions. The pressure intensifier includes a body having a cavity used as an internal fluid reservoir. Furthermore, a damping mechanism limits the relative acceleration between pressure intensifier components during operation.

29 Claims, 10 Drawing Sheets

Fig-10 SECTION F-F

Fig-9 SECTION C-C

Fig-8 SECTION B-B

AIR-TO-OIL INTENSIFYING CYLINDER

BACKGROUND AND SUMMARY OF THE INVENTION

The present invention relates generally to a force producing apparatus and, more particularly, to an air-to-oil pressure intensifier for providing relatively large forces to machines such as clamps, grippers, presses and punches.

Many systems utilize the basic principle of inserting a rod into an enclosed oil-filled chamber to produce force. Several of the oil systems use multiple steel cylinder sections interconnected with threaded tie rods and nuts. An oil reservoir is either contained internally within one of the steel cylinder sections or mounted externally. The external reservoir is piped to the intensifying cylinder. Difficulties may arise when attempting to package the cylindrically shaped assemblies as well as provide space and structure to mount the external oil reservoirs. To provide various stroke lengths and power strokes, many slightly different components must be constructed and maintained in an inventory.

Accordingly, it would be beneficial to provide a compact air-to-oil intensifier having a one-piece rectangular body. It would also be beneficial to provide a device eliminating the need for an external oil reservoir.

The present invention provides a pressure intensifier for providing relatively large output forces using an air over hydraulic force amplification system. According to one aspect of the present invention, a rod is driven into a sealed chamber of substantially incompressible fluid to generate an output force.

According to another aspect of the present invention, a compact, lightweight pressure intensifier is provided.

According to another aspect of the present invention, a bore is machined into the body and is utilized as an internal fluid reservoir.

Yet another aspect of the present invention relates to a body having internal porting to minimize the need for external fluid lines.

Another aspect of the present invention includes a damping mechanism to limit the accelerations of pressure intensified components relative to one another.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
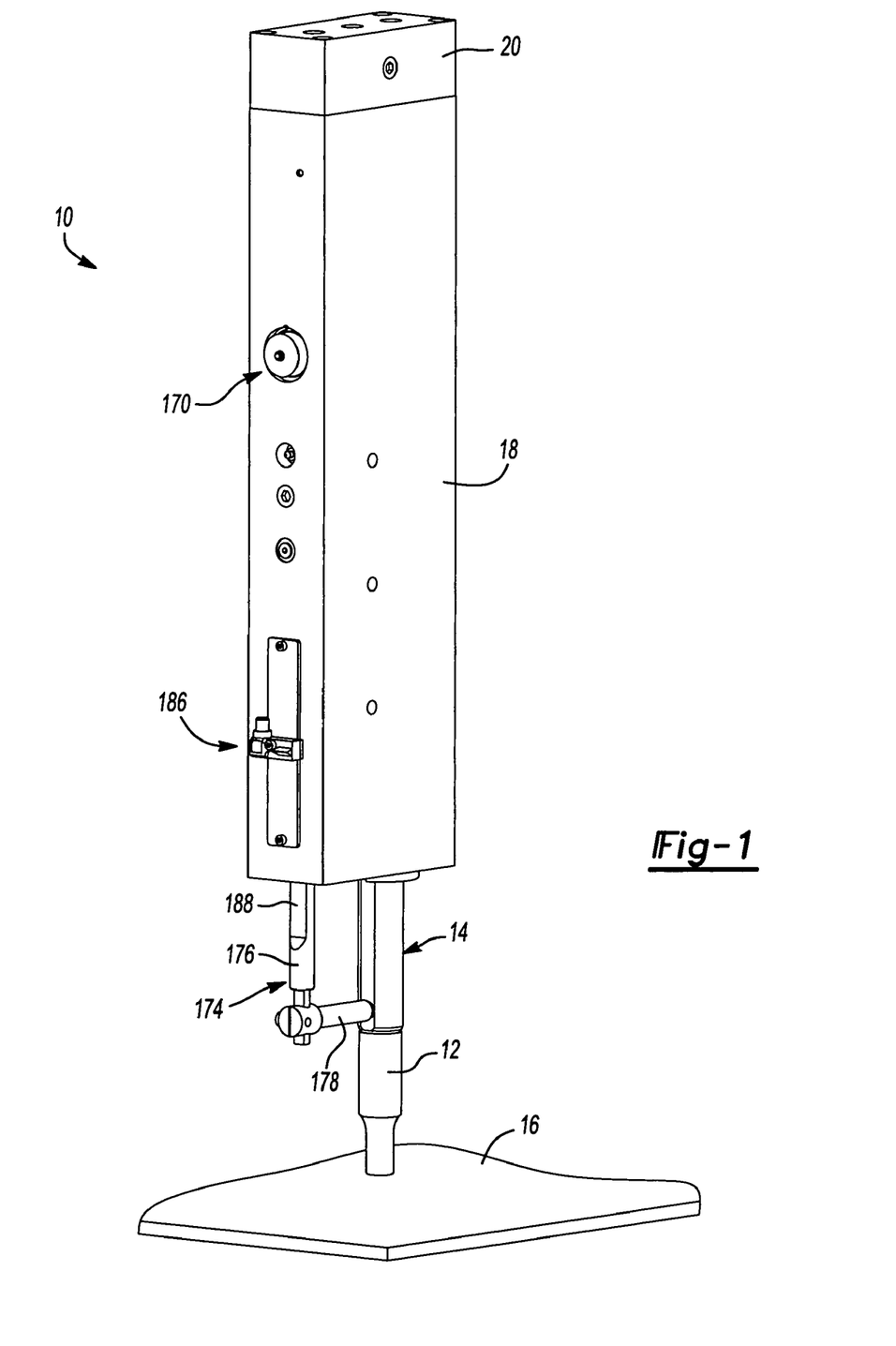
FIG. 1 is a perspective view of a pressure intensifier according to the principles of the present invention.
Figure 2:
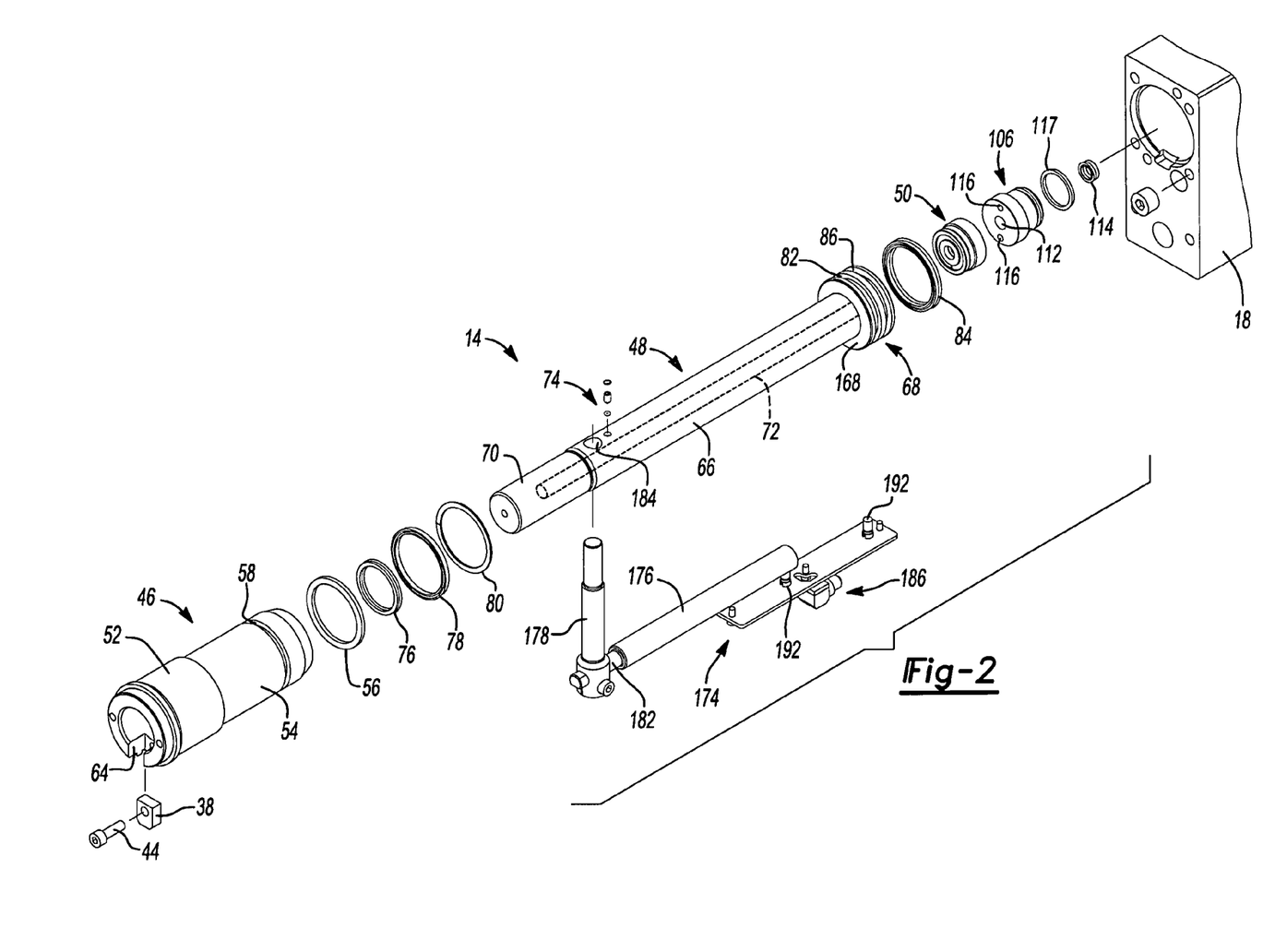
FIG. 2 is a partial exploded perspective view of the pressure intensifier shown in FIG. 1.
Figure 3:
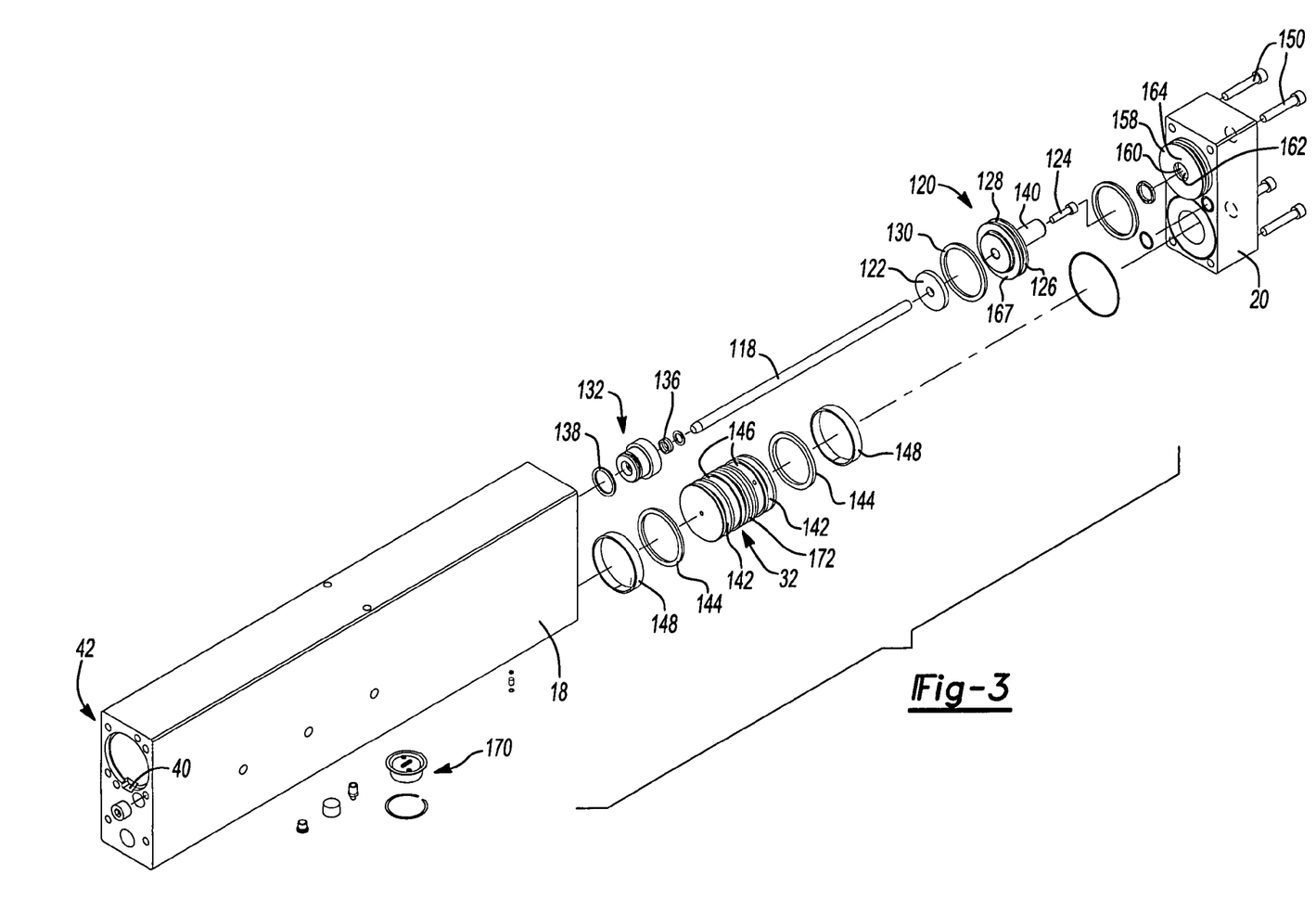
FIG. 3 is another partial exploded perspective view of the pressure intensifier shown in FIG. 1.

With reference to FIGS. 1–3, an air-to-oil pressure intensifier constructed in accordance with the teachings of the present invention is identified at reference numeral 10. Pressure intensifier 10 functions to provide a relatively large output force at a driven end using only compressed air at relatively low pressure (80 to 120 psi) as the power source. Typically, the driven end of the pressure intensifier is coupled to tooling such as a clamp half, a rivet hammer or a punch, collectively identified as a tool 12.

Pressure intensifier 10 operates by advancing and retracting a ram assembly 14 to place tool 12 into engagement with a work piece 16. As will be described in greater detail hereinafter, pressure intensifier 10 operates to rapidly translate tool 12 toward work piece 16 using relatively low force. Once tool 12 contacts work piece 16, pressure intensifier 10 generates a greatly multiplied force between tool 12 and work piece 16. On the return stroke, pistons with relatively large working areas within pressure intensifier 10 are pressurized to retract the ram in preparation for the next work cycle.

As shown in FIGS. 1–4, pressure intensifier 10 includes a substantially rectangular one-piece body 18 coupled to an end cap 20. Ram assembly 14 is positioned within a first cavity 24 of body 18. An intensifier assembly 26 is positioned within a second cavity 28 of body 18. First cavity 24 and second cavity 28 are interconnected by a first passageway 30. An oil piston 32 is positioned within a third cavity 34 of body 18. Third cavity 34 is plumbed in fluid communication with passageway 30. An oil filling port 36 extends from an outer surface of body 18 and terminates at third cavity 34 to allow a user to add fluid to the reservoir defined by third cavity 34 without disassembling pressure intensifier 10.

Ram assembly 14 is positioned within first cavity 24 and is free to axially move therein. A key 38 is positioned within a slot 40 formed at a first end 42 of body 18. A fastener 44 couples key 38 to body 18. Key 38 engages ram assembly 14 and functions to prevent rotation of ram assembly 14 relative to body 18.

Figure 5:
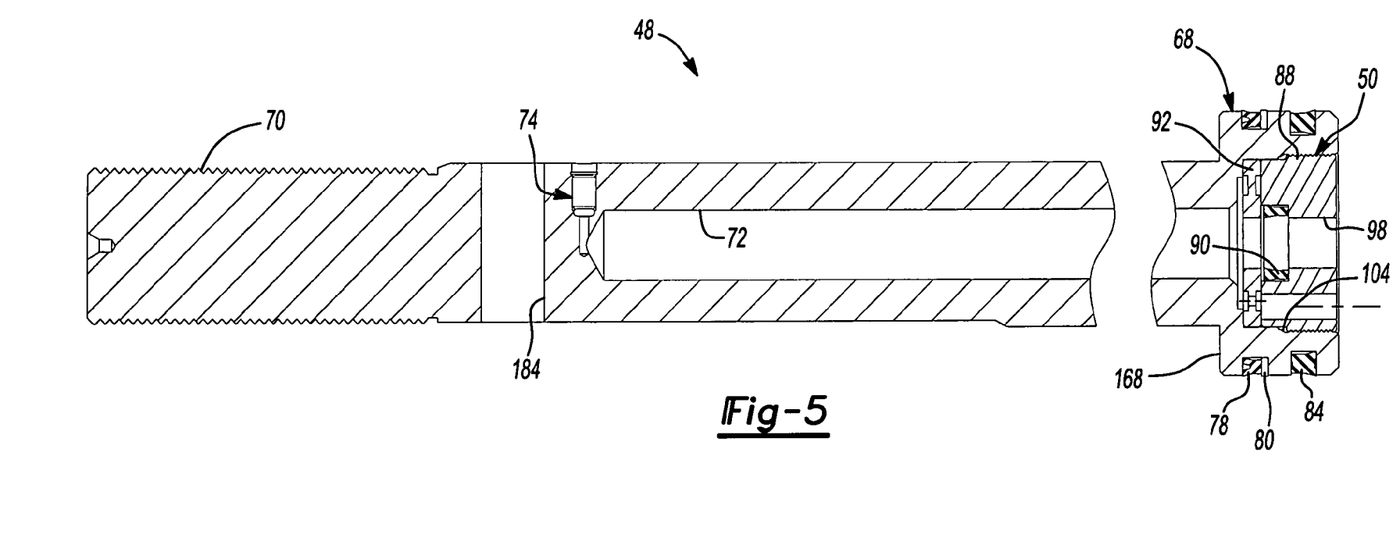
FIG. 5 is a partial, fragmentary cross-sectional side view of a ram of the pressure intensifier.

With reference to FIGS. 2 and 5, ram assembly 14 includes a ram guide 46, a ram 48 and an anti-shock assembly 50. Ram guide 46 is a substantially cylindrical hollow member preferably constructed from bronze. Ram guide 46 includes an externally threaded first section 52 and a second section 54 having a reduced outer diameter. A seal 56 is positioned within a groove 58 formed in second section 54. Seal 56 engages a smooth bore portion 60 of first cavity 24. First cavity 24 includes an enlarged threaded portion 62 proximate to first end 42 of body 18. Externally threaded section 52 of ram guide 46 is coupled to body 18 at threaded portion 62. Ram guide 46 includes a slot 64 aligned with key 38 and slot 40 of body 18.

Ram 48 is an elongated member having a substantially cylindrical body 66 and an enlarged head 68. Body 66 includes a threaded nose portion 70 positioned at an end opposite head 68. A pocket 72 extends axially through head 68 and into body 66. A bleeder assembly 74 is positioned in fluid communication with pocket 72. Bleeder assembly 74 is operable to allow air which may have been inadvertently trapped within pocket 72 to escape to atmosphere. An inner diameter seal 76 is positioned within a groove of ram guide 46 to sealingly engage body 66 of ram 48.

Ram 48 functions as a piston slidable positioned within first cavity 24. To form a sealing piston, a seal 78 and back up ring 80 are positioned within a forward groove 82 of head 68. A high pressure seal 84 is positioned within a rearward groove 86 positioned on head 68.

Figure 6:
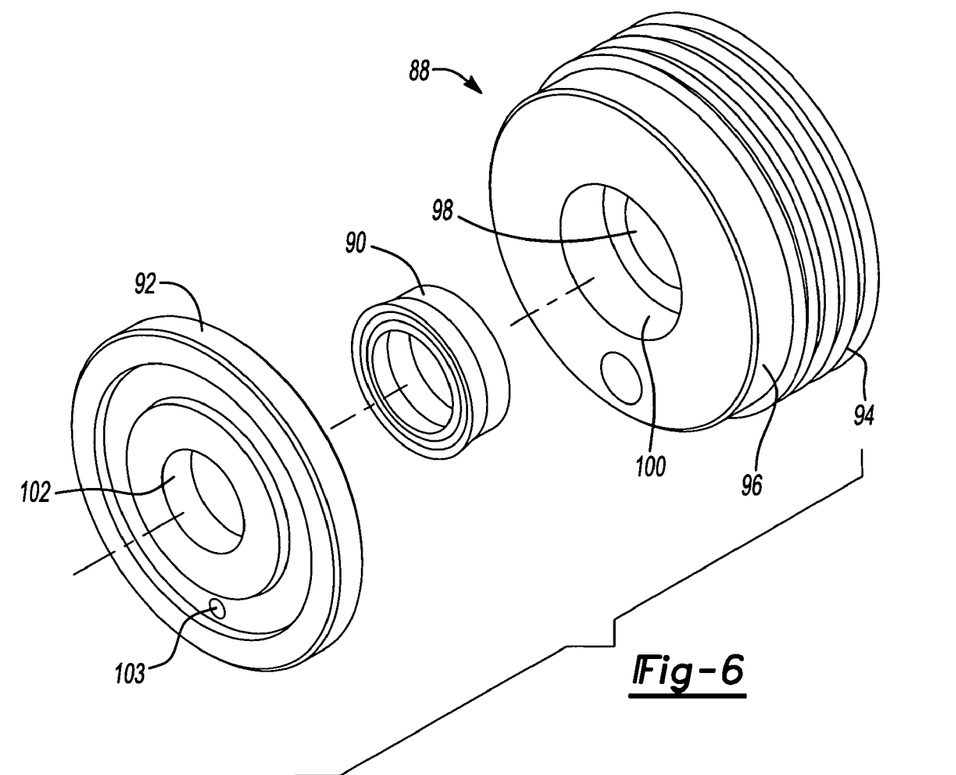
FIG. 6 is an exploded perspective view of an anti-shock assembly constructed in accordance with the teachings of the present invention.
Figure 7:
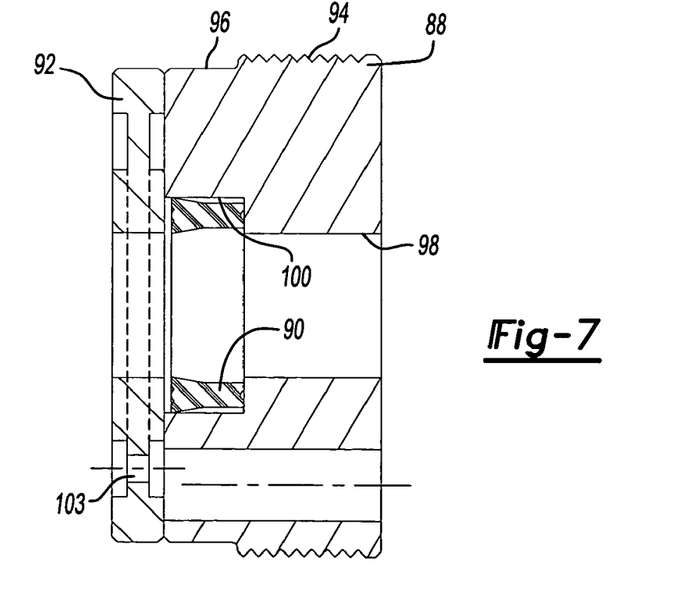
FIG. 7 is a cross-sectional side view of the anti-shock assembly.

As shown in FIGS. 5, 6 and 7, anti-shock assembly 50 includes a seal retainer 88, a seal 90 and a washer 92. Seal retainer 88 is a substantially cylindrical member having a threaded outer portion 94 and an adjacent pilot portion 96 having a diameter less than threaded portion 94. A bore 98 extends through seal retainer 88. Seal 90 is seated within a counter bore 100 coaxially positioned with bore 98.

Washer 92 is a substantially disk shaped member having a first aperture 102 axially aligned with bore 98 of seal retainer 88. A second aperture 103 extends substantially parallel to first aperture 102. Second aperture 103 functions as an orifice for damping undesirable shock produced during piercing type operations as will be described in greater detail hereinafter.

Anti-shock assembly 50 is threadingly engaged with a threaded portion of a counter bore 104 formed in the head end of ram 48. Seal 90 and washer 92 are trapped within an unthreaded portion of counter bore 104 adjacent the threaded portion.

As shown in FIGS. 8–11, a seal retainer 106 is threadingly fitted within a stepped recess 110 formed at the rearward end of first cavity 24. A counter bore 112 extends through seal retainer 106. A seal 114 is positioned within counter bore 112 and captured within recess 110 upon installation of seal retainer 106. Preferably, seal 114 and seal retainer 106 are assembled separately and coupled to body 18 as one unit. Seal retainer 106 includes a pair of blind bores 116 for receipt of a tool (not shown) for installing the seal retainer and seal assembly to body 18 without the use of snap rings and snap ring pliers. A seal 117 seals the outer diameter of seal retainer 106 and body 18.

Figure 11:
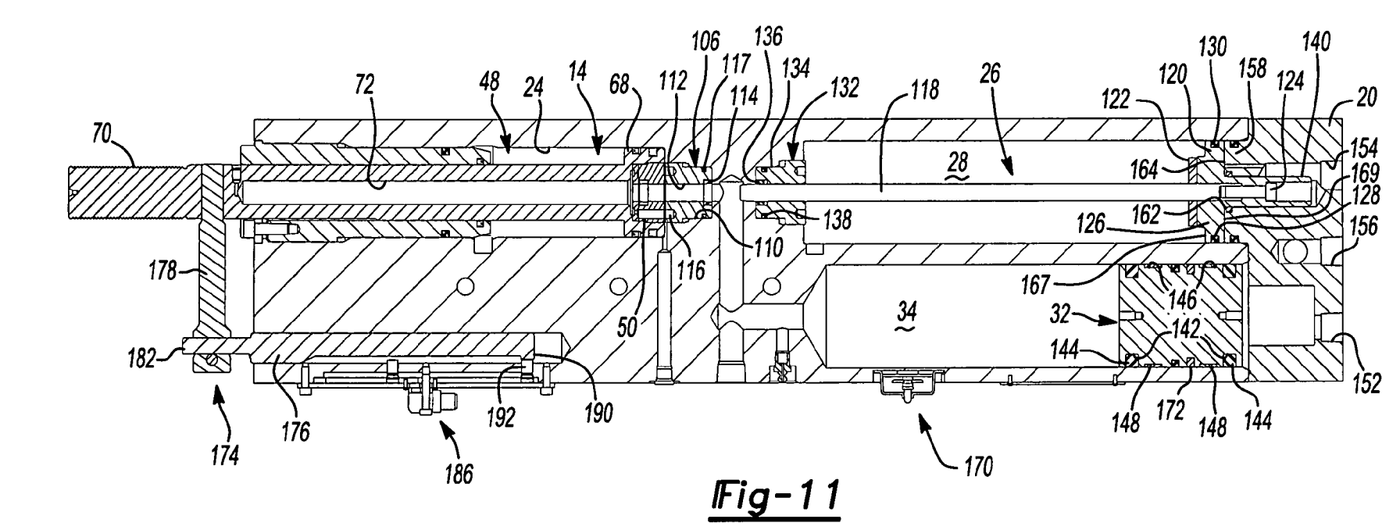
FIGS. 11–14 are cross-sectional side views of the pressure intensifier of the present invention depicting the position of various components at different stages during operation.

Intensifier assembly 26 includes an intensify rod 118 coupled to an intensify piston 120 and a damping washer 122. A fastener 124 couples intensify rod 118 and damping washer 122 to intensify piston 120.

Intensify piston 120 includes a body 126 having an annular groove 128. A seal 130 is positioned within groove 128 and sealingly engages the wall of second cavity 28. A second seal retainer 132 is substantially identical to seal retainer 106. Second seal retainer 132 is threadingly coupled to body 18 within a stepped recess 134 positioned at a forwardmost end of second cavity 28. A seal 136 is positioned within a counter bore of second seal retainer 132. A seal 138 is positioned within an external groove formed on second seal retainer 132 and engages body 18. Intensify piston 120 includes a cylindrically shaped protrusion 140 which cooperates with end cap 20 to reduce impact of the intensify piston with the end cap during the return stroke as will be described in greater detail hereinafter.

Intensify piston 120 is slidably positioned within second cavity 28. Intensify rod 118 extends from second cavity 28 through passageway 30 into first cavity 24. During operation, intensify rod 118 selectively enters pocket 72 of ram 48.

Oil piston 32 is a substantially cylindrical member having a first pair of external annular grooves 142 for receipt of a pair of seals 144. A second pair of annular grooves 146 are formed at each of end of oil piston 32. Bearing sleeves 148 are coupled to oil piston 32 at second grooves 146. Bearing sleeves 148 are preferably constructed from a bearing material such as a RULON® (a reinforced PTFE compound) to ensure that oil piston 32 slides within third cavity 34.

End cap 20 is coupled to body 18 via threaded fasteners 150. End cap 20 includes a first port 152, a second port 154 and a third port 156. First port 152 is in fluid communication with third cavity 34. Second port 154 extends through end cap 20 and is in fluid communication with second cavity 28. A boss 158 of end up 20 extends into second cavity 28. A first passageway 160 extends through boss 158 in communication with second port 154. First passageway 160 is sized for receipt of protrusion 140 of intensify piston 120. A seal 162 is positioned within first passageway 160 to selectively engage protrusion 140 during a retracting motion of intensifier assembly 26. An orifice 164 is also formed in boss 158. Orifice 164 provides a parallel path for fluid to escape second cavity 28 during retraction of intensifier assembly 26. Impact of intensify piston 120 on boss 158 is alleviated because protrusion 140 engages seal 162 to block first passageway 160. At this time, air trapped between end cap 20 and intensify piston 120 is forced to travel through orifice 164 in order to escape. The restricted flow retards the rate of retraction of intensify piston 120.

Figure 4:
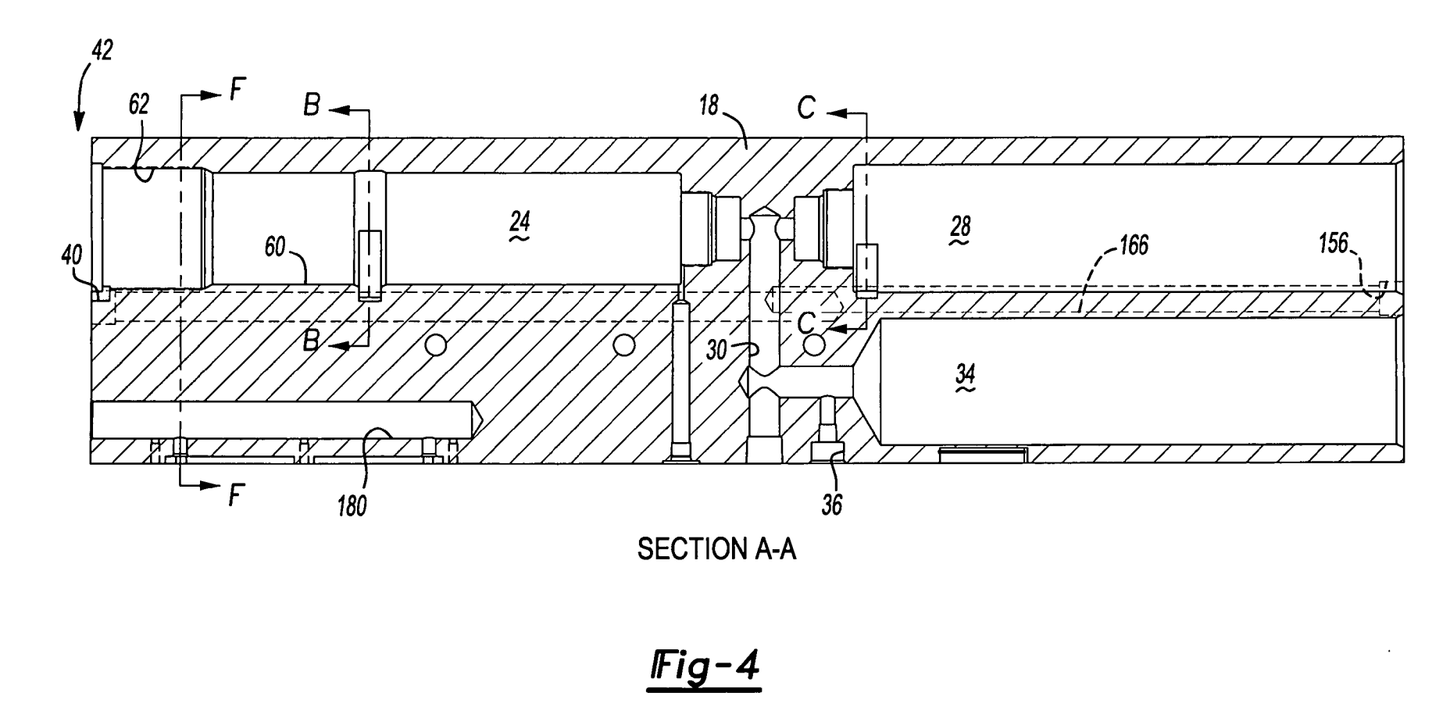
FIG. 4 is a cross-sectional side view of a body of the pressure intensifier of the present invention.
Figure 8:
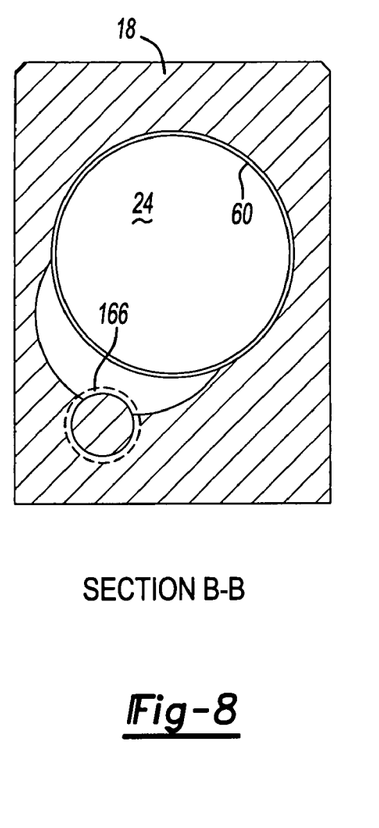
FIG. 8 is a cross-sectional end view of the body taken along line B—B as shown in FIG. 4.
Figure 9:
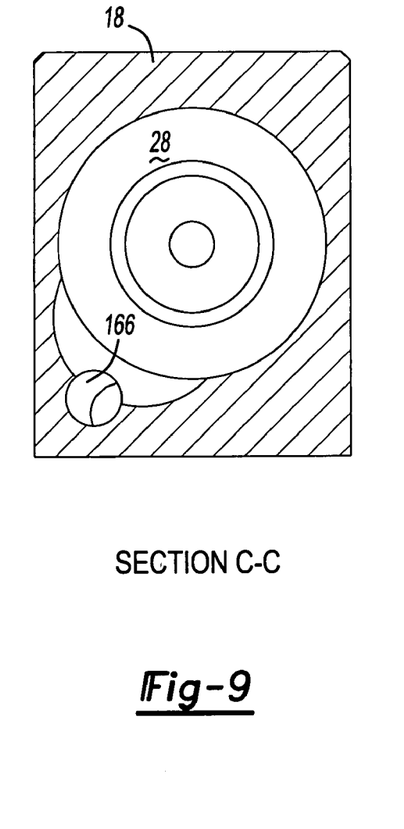
FIG. 9 is a cross-sectional end view of the body of the pressure intensifier of the present invention taken along line C—C of FIG. 4.
Figure 10:
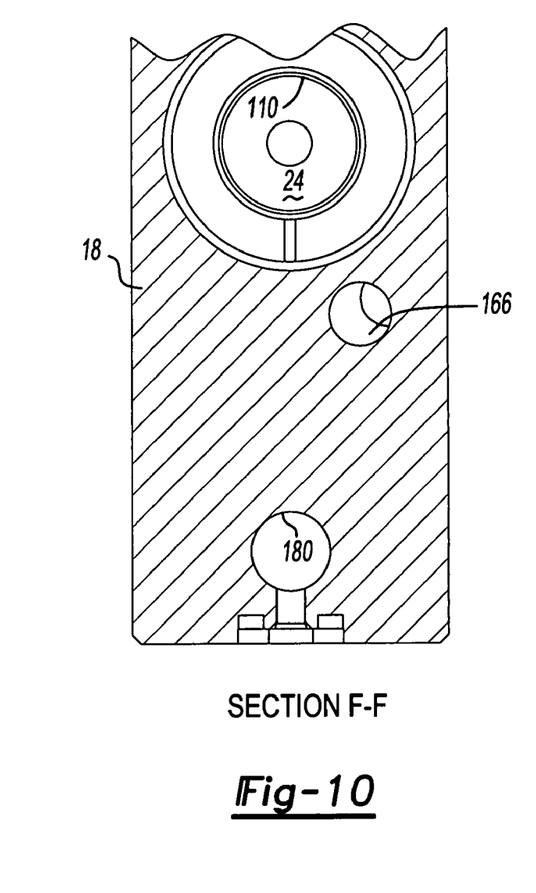
FIG. 10 is a cross-sectional end view of the body of the pressure intensifier taken along line F—F as shown in FIG. 4.

With reference to FIG. 4, body 18 includes a return passageway 166 in fluid communication with third port 156. Return passageway 166 provides a path for pressurized air to act on a forward face 167 of intensify piston 120 and a forward face 168 of ram 48. Specifically, return passageway 166 communicates with first cavity 24 as depicted in FIG. 8. Furthermore, return passageway 166 communicates with second cavity 28 as shown in FIG. 9.

With reference to FIGS. 11–14, operation of pressure intensifier 10 will now be described. FIG. 11 depicts ram assembly 14, intensifier assembly 26 and oil piston 32 in their fully retracted positions. At this time, it should be appreciated that intensify rod 118 is sealingly engaged with inner diameter seal 114 of second seal retainer 132 but is spaced apart from the seal of seal retainer 106. Accordingly, fluid may flow from third cavity 34 into first cavity 24 and pocket 72.

Figure 12:
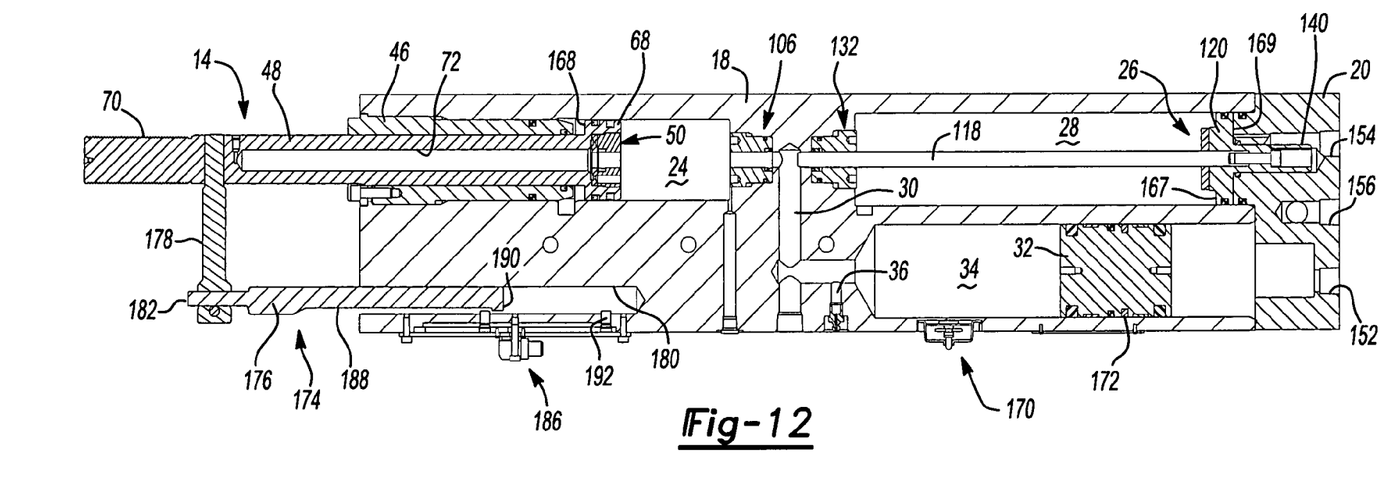

To initiate movement of ram assembly 14 in an advanced direction, pressurized air is supplied to first port 152 while second port 154 and third port 156 are opened to atmosphere. Pressurized fluid acts on oil piston 32 causing it to advance from right to left as shown in FIG. 12. A substantially incompressible fluid is positioned within a portion of third cavity 34 and a portion of first cavity 24 between oil piston 32 and head 68 of ram 48. The pressurized incompressible fluid acts on ram 48 causing the ram to advance. During the first phase of actuation, ram 48 is extended rapidly using relatively low force to cause tool 12 to contact workpiece 16.

Figure 13:
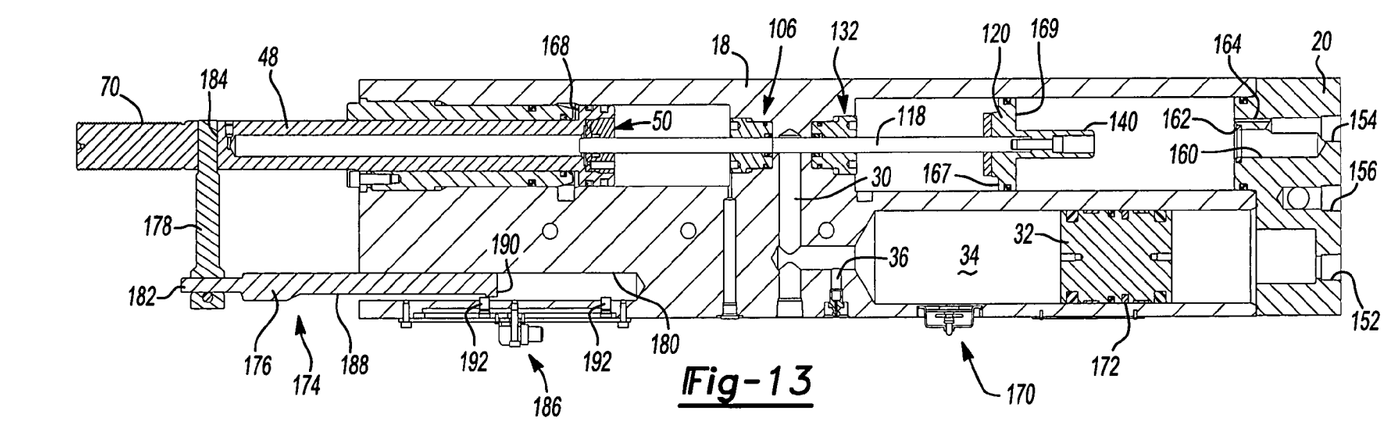

Once ram 48 contacts the workpiece, pressure continues to build within third cavity 34. Once a predetermined pressure is met, first port 152 is closed and pressurized air is supplied to second port 154. Pressurized air acts on a rearward face 169 of intensify piston 120 causing intensifier assembly 26 to advance as depicted in FIG. 13. During advancement, intensifier rod 118 engages the inner diameter seal of seal retainer 106. Pressure intensification begins at this time because the incompressible fluid is trapped within first cavity 24 and pocket 72. Pressure intensification continues to occur while intensify rod 118 enters anti-shock assembly 50 at FIGS. 13 and 14.

Anti-shock assembly 50 functions to minimize undesirable acceleration of ram 48 which may occur at the end of certain processes such as stamping or punching. For example, during a punching operation, resistance to pressure applied by ram 48 is great during the initial stages of material deformation. However, it is common for the last two-thirds of the thickness of material to rapidly break away offering little to no resistance to the force from ram 48. During this last portion of the punching operation, ram 48 has a tendency to accelerate relative to intensify rod 118 possibly causing internal cavitation of hydraulic fluid, premature cylinder wear and/or premature seal wear. To limit these possibly negative effects, anti-shock assembly 50 sealingly engages intensify rod 118 to define a first trapped volume in pocket 72 and a second trapped volume in the rearmost portion of first cavity 24. Intensify rod 118 may enter pocket 72 but only at the rate defined by the orifice extending through anti-shock assembly 50. Similarly, the speed at which intensify rod 118 may exit pocket 72 is limited by the flow rate of incompressible fluid through the orifice of anti-shock assembly 50.

Figure 14:
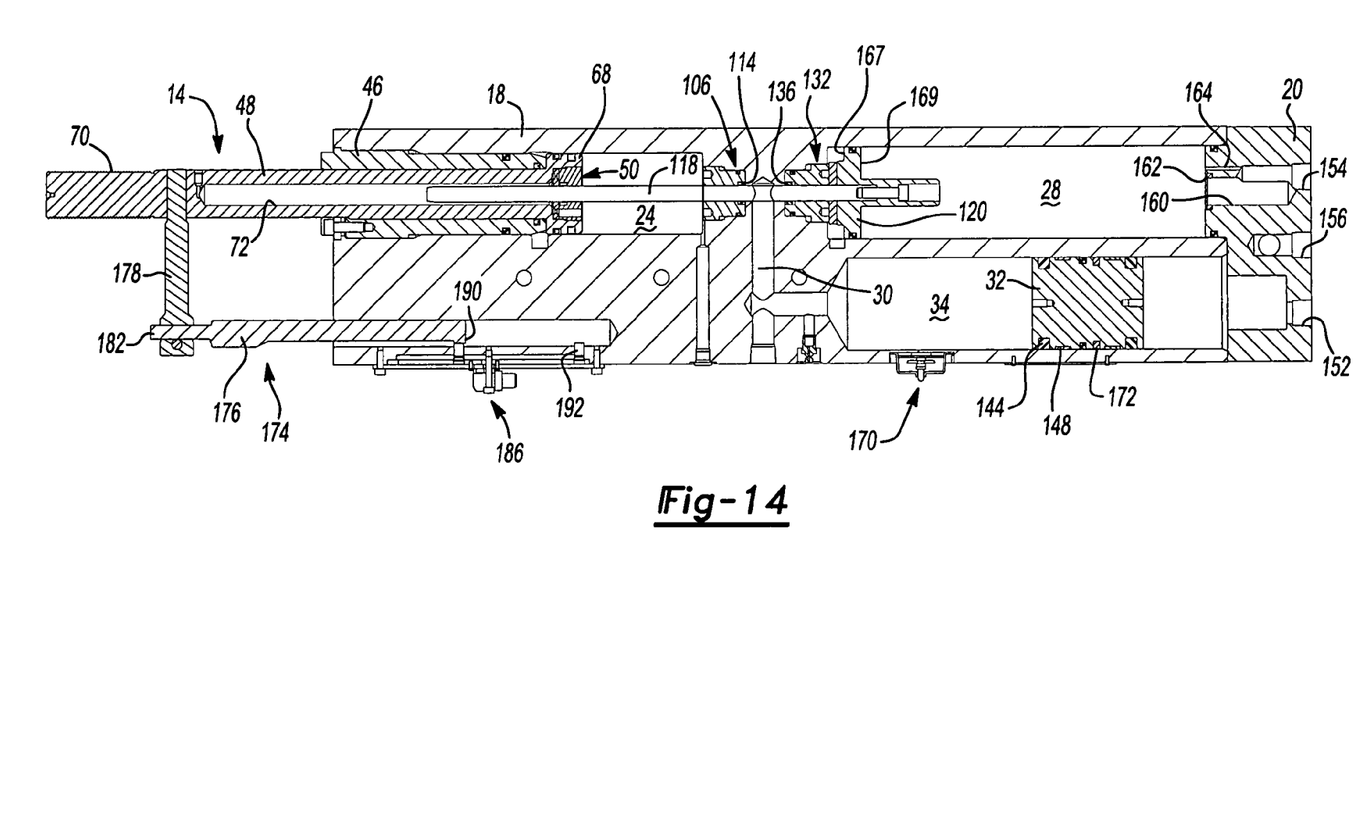

FIG. 14 depicts ram 48 and intensifier assembly 26 at their fully advanced positions where the work has been completed. Pressurized air is supplied to third port 156 while first port 152 and second port 154 are exhausted. As mentioned earlier, supply of pressurized air to port 3 travels through return passageway 166 to act on forward face 167 of intensify piston 120 and forward face 168 of ram 48. Hydraulic fluid is transferred from first cavity 24 to third cavity 34 once intensify rod 118 clears seal retainer 106. At this time, each of ram assembly 14, intensifier assembly 26 and oil piston 32 will be returned to their fully retracted positions shown in FIG. 11.

An oil level indicator 170 is positioned near a forward end of third cavity 34. Oil level indicator 170 functions to signal an operator that it is time to add fluid to the reservoir. A magnet 172 is coupled to oil piston 32. As oil is depleted from the system during use, oil piston 32 is allowed to advance further within third cavity 34. When oil piston 32 advances to a position where magnet 172 is proximate oil level indicator 170, a lamp is illuminated to signal the operator. In one embodiment, the lamp pulsates on and off to attract the operator's attention.

An optional proximity sensing assembly 174 includes a longitudinal rod 176 and a transverse rod 178. Longitudinal rod 176 is slidably positioned within a bore 180 (FIG. 10) extending substantially parallel to first cavity 24. One end of transverse rod 178 is coupled to a necked-down portion 182 of longitudinal rod 176. An opposite end of transverse rod 178 is positioned within an aperture 184 transversely extending through ram 48. As ram 48 axially translates, transverse rod 178 and longitudinal rod 176 also translate. Proximity switch 186 is coupled to body 18 to bore 180. Longitudinal rod 176 includes a relieved portion 188 axially extending along a substantial portion of longitudinal rod 176. Relieved portion 188 effectively defines a step 190 at the free end of longitudinal rod 176. As step 190 is positioned proximate one of sensor heads 192, a signal is generated. The position of transverse rod 178 may be adjusted relative to longitudinal rod 176 to allow a user to correlate the position of ram 48 to the signal produced by proximity switch 186.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A pressure intensifier for supplying force, the pressure intensifier comprising:
    a one-piece housing having first, second and third cavities in fluid communication with one another, said first and second cavities being substantially coaxially aligned with one another, said third cavity being positioned in an offset relationship to said first and second cavities;
    first, second and third pistons slidably positioned in said first, second and third cavities, respectively, said third piston being selectively moveable to transfer a fluid between said first and third cavities; and
    a rod coupled to said second piston, said rod being drivable between an advanced position and a retracted position, said rod being engageable with a seal and operable to enter said first cavity to produce an amplified force on said first piston.

2. The pressure intensifier of claim 1 wherein said first piston and said second piston are selectively drivable toward said retracted position.

3. The pressure intensifier of claim 1 wherein said third cavity contains a reservoir of fluid separately sealed from said first and second cavities when said rod engages said seal.

4. The pressure intensifier of claim 1 wherein said housing includes a first port in fluid communication with said third cavity, a second port in fluid communication with said second cavity and a third port in communication with a return passageway extending through said housing, said return passageway being in communication with said first and second cavities.

5. The pressure intensifier of claim 4 wherein application of a pressurized fluid to said first port causes said third piston and said first piston to move toward said advanced position.

6. The pressure intensifier of claim 5 wherein application of said pressurized fluid to said second port drives said second piston and said rod toward said advanced position to amplify the fluid pressure acting on said first piston.

7. The pressure intensifier of claim 6 wherein application of said pressurized fluid to said third port causes said first and second pistons to move toward said retracted position.

8. The pressure intensifier of claim 1 further including a proximity sensor having a shaft, said shaft being slidably positioned within a bore of said housing and coupled to said first piston.

9. The pressure intensifier of claim 8 wherein said proximity sensor is operable to output a signal indicative of the position of said first piston.

10. The pressure intensifier of claim 9 wherein said shaft is moveable in the same direction as said first piston.

11. The pressure intensifier of claim 10 wherein said proximity sensor includes a transversely extending shaft interconnecting said shaft and said first piston.

12. The pressure intensifier of claim 1 further including an oil level indicator operable to produce a signal indicative of a fluid level contained in said third cavity.

13. The pressure intensifier of claim 12 wherein said oil level indicator includes a magnet coupled to said third piston and a sensor operable to detect the presence of said magnet at a predetermined location.

14. The pressure intensifier of claim 1 wherein said first and third pistons each include a first face acted on by a first fluid and a second face opposite said first face acted on by a second fluid.

15. The pressure intensifier of claim 1 wherein said third cavity includes a common sidewall with one of said first and second cavities.

16. A pressure intensifier comprising:
a housing;
first and second pistons slidably positioned in said housing; and
a rod coupled to said second piston, said rod being drivable between an advanced position and a retracted position, said rod cooperating with a first seal to capture an incompressible fluid in a first cavity at least partially defined by said first piston, said rod cooperating with a second seal to divide said first cavity into two compartments, said second seal being coupled to said first piston, said first piston including an orifice to limit a flow of said incompressible fluid between said two compartments and limit the acceleration of said first piston relative to said rod.

17. The pressure intensifier of claim 16 further including a third piston slidably positioned within said housing, said third piston being selectively drivable to force said incompressible fluid into said first cavity when said rod is disengaged from said first seal.

18. The pressure intensifier of claim 17 wherein one of said compartments includes a pocket formed in said first piston.

19. The pressure intensifier of claim 18 wherein a portion of said first piston extends beyond said housing, said first piston being adapted to exert force on a workpiece.

20. The pressure intensifier of claim 16 further including a third seal in cooperation with said rod, said third seal being positioned in a second cavity of said housing, said second piston being slidably moveable within said second cavity, said third seal restricting said incompressible fluid from entering said second cavity.

21. A method of operating a pressure intensifier having a one-piece housing as well as first, second and third pistons slidably moveable within the housing, the pressure intensifier further having an incompressible fluid positioned between the first and third pistons and a rod coupled to the second piston, the method comprising:
moving the third piston along a first axis in an advancing direction to displace the incompressible fluid and drive the first piston in said advancing direction;
driving the second piston and the rod along an axis substantially parallel to and offset from said first axis to trap a portion of the incompressible fluid in a cavity including the first piston; and
advancing the rod to produce an intensified pressure on the first piston.

22. The method of claim 21 wherein moving the third piston includes applying a pressurized fluid to the third piston.

23. The method of claim 22 wherein driving the second piston includes applying a pressurized fluid to the second piston.

24. The method of claim 23 further including storing excess incompressible fluid in a reservoir within the housing, the third piston contacting the excess incompressible fluid.

25. The method of claim 21 further including engaging the rod with a damping device to limit the acceleration of the rod relative to the first piston.

26. The method of claim 21 further including mounting an end cap to the housing to close two separate piston cavities.

27. A method of operating a pressure intensifier having a housing as well as first, second and third pistons slidably moveable within the housing, the pressure intensifier further having an incompressible fluid positioned between the first and third pistons and a rod coupled to the second piston, the method comprising:
moving the third piston in an advancing direction to displace the incompressible fluid and drive the first piston in said advancing direction;
driving the second piston and the rod in said advancing direction to trap a portion of the incompressible fluid in a cavity including the first piston;
advancing the rod to produce an intensified pressure on the first piston; and
engaging the rod with a damping device to limit the acceleration of the rod relative to the first piston, wherein the damping device includes an orifice limiting the flow rate of the incompressible fluid from a first side of the damping device to a second side.

28. A pressure intensifier comprising:
first, second and third cavities formed as open-ended bores in a housing;
passageways formed in the housing to interconnect the cavities;
first, second and third pistons slidably positioned within the first, second and third cavities, respectively, said third piston being selectively moveable to transfer a fluid between said first and third cavities; and
a rod coupled to said second piston, said rod being drivable between an advanced position and a retracted position, said rod being engageable with a seal and operable to enter said first cavity to produce an amplified force on said first piston, wherein said third cavity includes a common sidewall with one of said first and second cavities.

29. The pressure intensifier of claim 28 further including an end cap mounted to the housing, the end cap substantially simultaneously closing at least two of the open-ended bores.

* * * * *